Dec. 11, 1962     E. B. SZYMCZAK     3,067,649
LIGHT PROBE FOR PHOTOGRAPHIC USE
Filed April 13, 1959     4 Sheets-Sheet 1
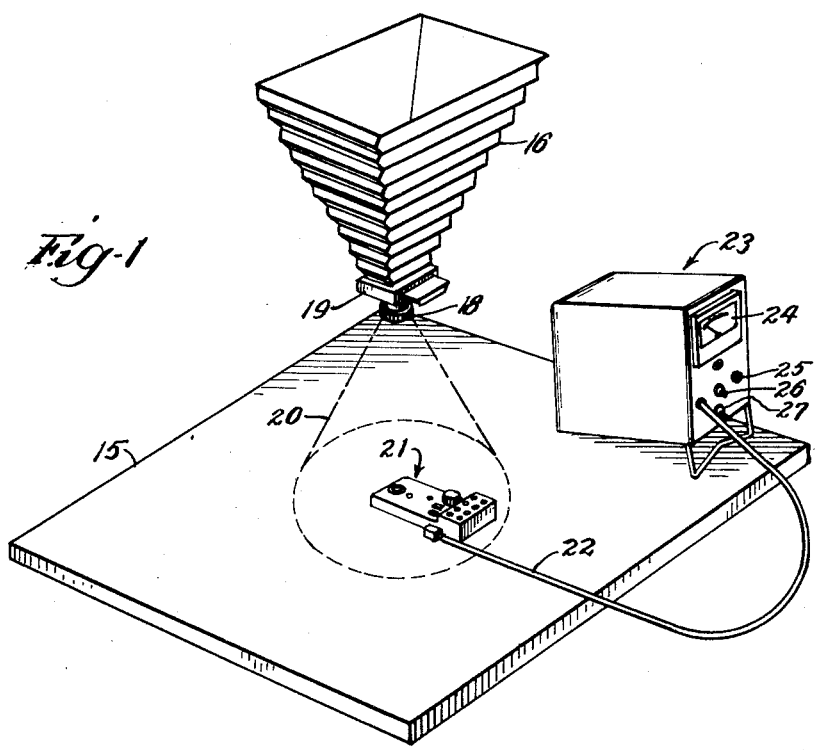
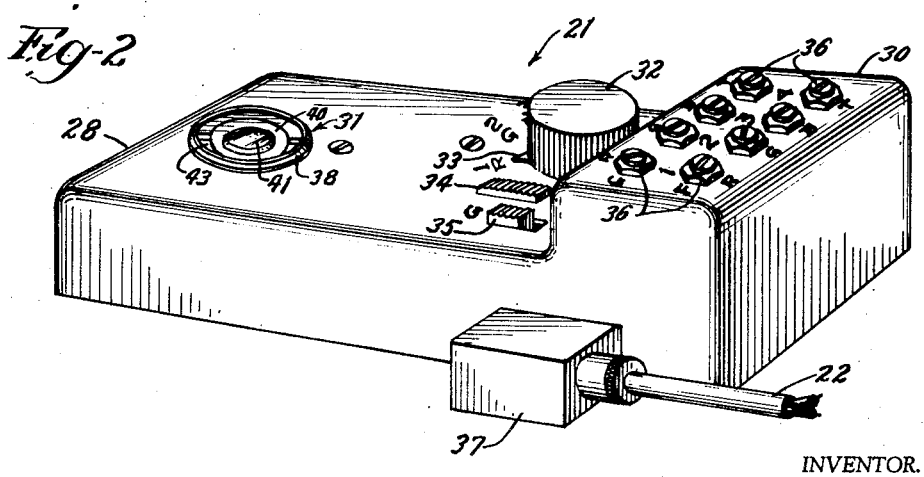
INVENTOR.
Eugene B. Szymczak
BY
Cromwell, Greist & Warden
Attys.

Dec. 11, 1962     E. B. SZYMCZAK     3,067,649
LIGHT PROBE FOR PHOTOGRAPHIC USE
Filed April 13, 1959     4 Sheets-Sheet 2
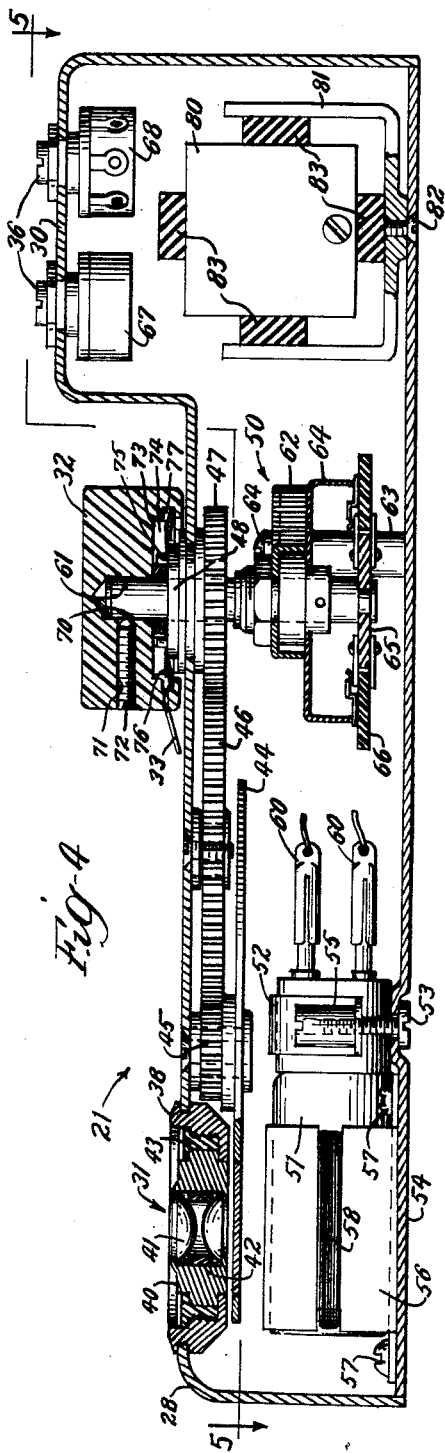
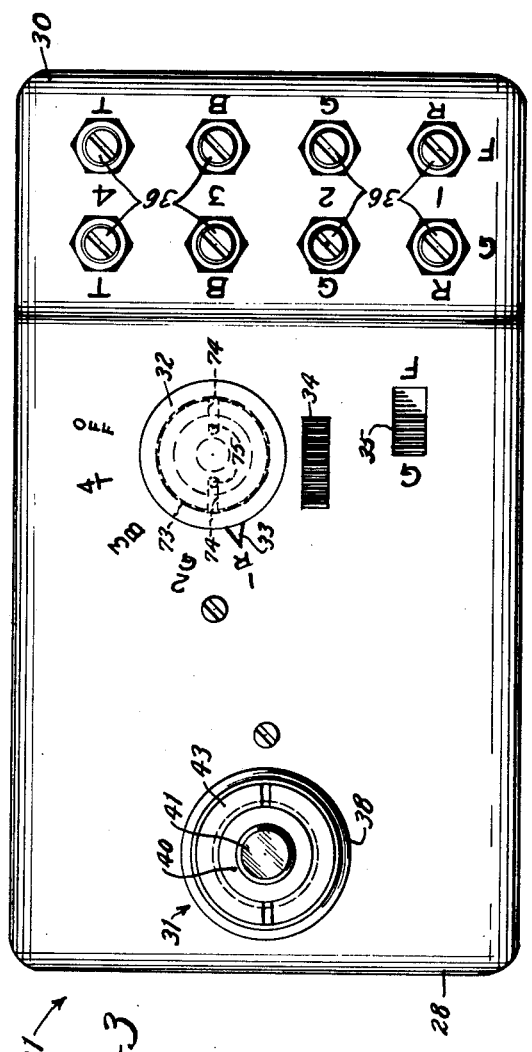
INVENTOR.
Eugene B. Szymczak
BY
Cromwell, Greist & Warden
Attys.

Dec. 11, 1962   E. B. SZYMCZAK   3,067,649
LIGHT PROBE FOR PHOTOGRAPHIC USE
Filed April 13, 1959   4 Sheets-Sheet 3
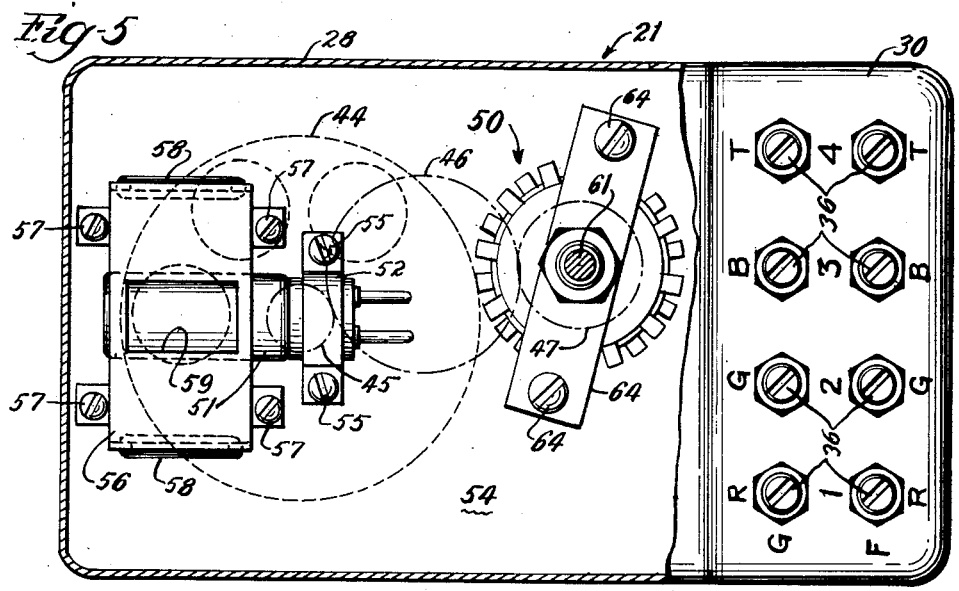
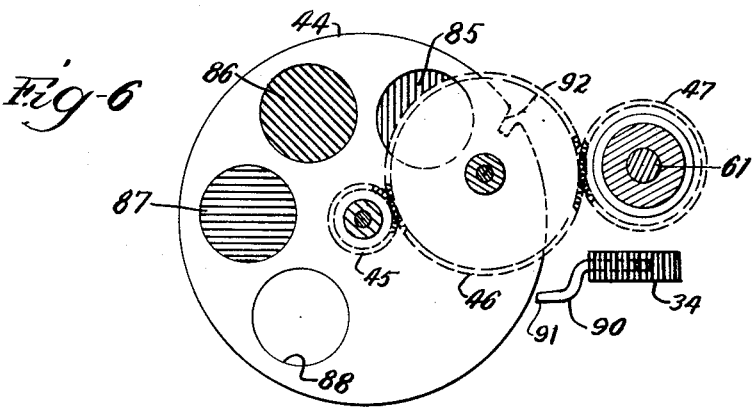
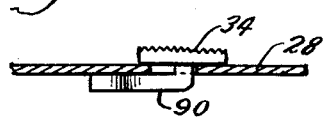
INVENTOR.
Eugene B. Szymczak
BY
Cromwell, Greist & Warden
Attys.

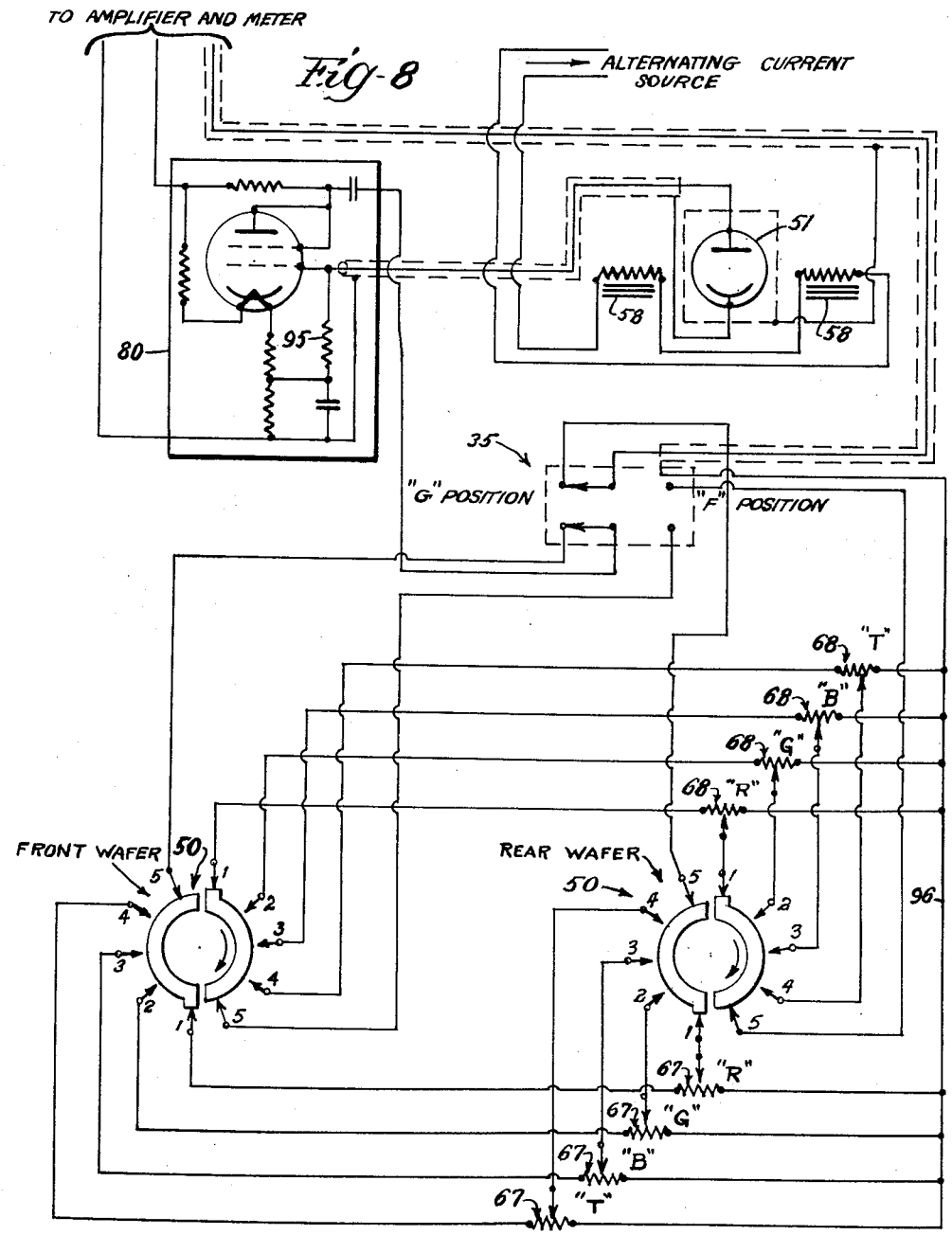

United States Patent Office

3,067,649
Patented Dec. 11, 1962

3,067,649
LIGHT PROBE FOR PHOTOGRAPHIC USE
Eugene B. Szymczak, Chicago, Ill., assignor to The Welch Scientific Company, a corporation of Illinois
Filed Apr. 13, 1959, Ser. No. 805,881
6 Claims. (Cl. 88—23)

The present invention relates to a new and improved light measuring device which is preferably in the form of a photographic exposure probe particularly adapted for use in color photography to provide for the evaluation of color component light transmissivity or density of a negative image in connection with calibrating for exposure control for printing purposes. More specifically, the present invention is directed to a light probe particularly adapted for use in color control in photographic printing to provide for consistent printing results under the best possible color tone reproduction conditions while materially reducing printing paper waste and time consumed through the elimination of standard trial and error methods. While the probe device of the present invention will be described in connection with its use in color and black and white photography, it will be readily apparent and should be fully understood that the new and improved mechanical and electrical features of the device also readily adapt the same for use in different industrial applications wherein light measurement of the type described performs a useful function.

In connection with color photography printing methods, each individual negative used should preferably be evaluated to determine the proper color component control necessary to obtain the best printing results. Individual filters are inserted in the lens housing of an enlarger to control (add or decrease) the amount of red, green and blue light projected on to printing paper for reproduction purposes. A cyan filter is used for red, a magenta filter is used for green, and a yellow filter is used for blue. With each individual negative it is necessary to evaluate the most desirable degree of color component filtering in order to obtain the best reproduction results. Consequently, color intensity evaluations must be made for each of the basic colors, such evaluations being heretofore rather complicated and time consuming. It has been considered that the development of an efficient and relatively uncomplicated method of determining and controlling optimum color tone reproduction would, for all intents and purposes, eliminate the rather widely practiced trial and error methods and result in an appreciable savings in time consumed by the printer or finisher and in printing expenses as a result of a substantial decrease in wasted printing paper.

It is an object of the present invention to provide a new and improved light measuring device of substantial versatility, the device being structurally and operationally compact and being particularly adapted for use in photographic printing.

A further object is to provide a new and improved color and black and white light probe particularly useful in photographic reproduction, the probe including a unitary control feature which materially simplifies the operational use thereof while providing for material savings in time and virtual if not complete elimination of standard trial and error methods.

Another important object of the present invention is to provide a new and improved color probe which incorporates in a single housing the essential components for light meter calibration, these components being operatively interconnected for at least semi-automatic unitary utilization thereof as well as individual and separate utilization thereof through single selector means.

Other objects not specifically set forth will become apparent from the following detailed description of the present invention made in conjunction with the accompanying drawings wherein:

FIG. 1 is a partly diagrammatic illustration of a photography printing arrangement illustrating operative use of the light measuring device of the present invention therein;

FIG. 2 is a perspective of the light measuring device;

FIG. 3 is a top plan view of the device;

FIG. 4 is an enlarged longitudinal section of the device;

FIG. 5 is a partly sectioned plan view of the device taken generally along line 5—5 in FIG. 4 and further illustrating in broken lines the operative location of the color filter mechanism forming a part of the device;

FIG. 6 is a plan view of the structural and operational features of the color filter mechanism, this mechanism being shown independently of the light measuring device to better illustrate the same;

FIG. 7 is a fragmentary and partly sectioned elevation of a filter disc lock means forming a part of the light measuring device; and FIG. 8 is a circuit diagram of the electrical wiring of the light measuring device.

A standard photographic reproduction and printing arrangement is illustrated in FIG. 1 as including a working surface or easel 15 positioned directly below a standard type enlarger 16 which includes a bellows providing for vertical movement of a lens system 18 associated with a negative and color filter housing 19 of known type. Light is projected through the negative, color filters and lens system onto the easel in the form of a cone 20 as generally illustrated and in the usual manner. Received on the easel 15 is the color probe 21 of the present invention, this probe being electrically connected through a cable 22 to a combined amplifier and meter unit 23 suitably supported on the easel or an adjacent surface. The meter face 24 in association with a movable pointer is readily observable in the unit 23 for light reading purposes. The unit 23 further includes a light meter calibration control 25 accessible on the face thereof, this control being of standard form for variable positioning by use of a common screw driver. The face of the unit 23 further carries a power switch 26 controlling operation of the unit 23 and probe 21 and a dial light switch 27 for the control of dial lights associated with the meter face 24 for illumination thereof.

Referring to FIGS. 2 and 3, the probe 21 is of box-like configuration including a housing 28 having a relatively long low portion and provided with an enlarged portion 30 at one end thereof. Mounted relative to the top surface of the housing 28 is an aperture lens system 31 through which light passes into the interior of the housing. A relatively large knob 32 is mounted on the housing 28 and forms a part of a filter and potentiometer selector switch. The knob 32 is provided with a pointer 33 which describes an arc along the top surface of the housing 28 in association with indicia printed thereon. As particularly shown in FIG. 3, this indicia includes a series of numbers ranging from one to four in respective association with the letters "R", "G", "B", and "T". The letters stand for the basic colors of red, green and blue and the letter "T" designates exposure time. To one side of the knob 32 is a switch button 34 which forms a part of a filter disc lock means. Additionally, the face of the housing 28 carries therethrough a switch button 35 for a purpose to be described.

The enlarged portion 30 of the housing 28 has mounted therein a plurality of potentiometer having adjustment means 36 extending through suitable openings in the housing portion 30 and fully accessible exteriorly thereof. The adjustment means 36 are slotted for operation by a common screw driver for a purpose to be described. The top surface of the enlarged housing portion 30 also carries indicia indentifying each of the potentiometers mounted therebelow with respect to related color and time usages. The potentiometers may be conventional carbon potentiometers. It will be noted that the probe 21 makes use of two series of four potentiometers each, the separate rows of these potentiometers being identified on the face of the housing portion 30 by the letters "G" and "F". Row "G" is used in connection with gray card color balance whereas row "F" is used in connection with flesh tone color balance. These separate designations and usages are well known to an experienced photographer and are referred to merely by way of example. The outer portion of the probe 21 is completed with a cable connector 37 used in connecting the cable 22 to the probe. The cable 22 extends from the connector 37 to electrically interconnect the probe 21 with the combined meter and amplifier unit 23 as shown in FIG. 1.

In FIG. 4, the aperture lens system 31 may be of any suitable construction and, as illustrated, includes a suitable lens housing 38 having received therein a lens system unit consisting of a lens holder 40 retaining therein cooperating lenses 41 held in spaced relation by a ring 42. The lens system is removably held in the lens housing 38 by a threaded retaining ring 43. Immediately below the aperture lens system 31 is positioned a filter wheel or disc 44 which is suitably journaled on the underside of the housing 28 and has fixedly mounted therewith a filter disc drive gear 45. Engaged with the filter disc 45 is an idler gear 46 suitably journaled for rotation on the inner surface of the top wall of the housing 28 and being further engaged with a drive gear 47 which is fixedly mounted on a hub assembly 48 forming a part of a rotary switch which is generally identified by the numeral 50.

Aligned with the aperture lens system 31 and below the filter disc 44 is a magnetically modulated phototube assembly including a phototube 51 held in place by a clamp 52 extending across the base thereof and having ear portions which are connected by screws 53 (only one shown) extending upwardly through the bottom plate 54 of the probe and in threaded engagement with sleeve-like fasteners 55 which are slotted for screw driver engagement. The light measuring end of the phototube 51 is received within a magnetic yoke 56 which is suitably held to the bottom plate 54 by screws or rivets 57 extending through attachment ears forming a part of the yoke. The yoke 56 is provided with magnetic field producing coils 58 of known type which are utilized in modulating a space current established in the phototube 51 upon light contact therewith in the manner disclosed in Patent No. 2,424,933. For this purpose the yoke 56 is provided with a window-like aperture 59 aligned with the aperture lens system 31 permitting light contact with the phototube. The prongs of the phototube 51 have suitably attached thereto lead connectors 60 of known type placing the phototube in the probe circuit.

The electrical portion of the switch 50 is of known type, this rotary switch being a five position switch having four poles with indexes each 30°. Generally, the switch 50 includes an operating shaft 61 extending vertically through the top wall of the housing 28 and the hub 48 and freely rotatable relative to the hub 48 and the drive gear 47 forming a part thereof. The switch 50 is supported in the housing 28 by a bracket 62 supported at its ends by internally threaded sleeve-like spacers 63 (only one shown) having screws 64 received through the bracket 62 and threaded into the spacers 63. The switch further includes a wafer spacer and holder 64 and inner and outer wafers 65 and 66. The lead connectors (not shown) forming a part of the switch 50 are suitably wired through a slide switch operated by the button 35 previously described to the "G" row of potentiometers 67 and to the "F" row of potentiometers 68 mounted in underslung relation in the enlarged housing portion 30. The switch operated by the button 35 is not shown but is preferably of the double pole, double throw, two position slide type and is utilized in switching the "G" row of potentiometers 67 into the probe circuit or the "F" row of potentiometers 68 into the probe circuit. Accordingly, the position of this switch as controlled by the button 35 will determine which row of potentiometers is operatively connected in the probe circuit whereas the switch 50 functions to control coupling and uncoupling of a single potentiometer 67 or 68 into or out of the probe circuit as selected from the row of potentiometers made available for this purpose by the switch controlled by the button 35.

The knob 32 of the switch 50 includes a recess in the bottom surface thereof surrounding a vertical shaft opening 70 in which the upper end of the switch shaft 61 is received. A threaded passage 71 extends through the side face of the knob 32 into communication with the opening 70 and receives therein a set screw 72 which fixes the knob 32 to the shaft 61. The bottom recess of the knob 32 has received therein a metal friction disc 73 having suitable apertures 74 therein for receiving upwardly projecting coupling pins 75 forming a part of the hub assembly 48. A resilient metallic friction ring 76 of gasket-like shape is received in an annular groove 77 associated with the outer end portion of the knob recess and the friction ring is in the form of a truncated cone placing the friction disc 73 under appreciable pressure and holding the same in tight frictional engagement with the adjacent surface of the knob 32.

Upon mounting of the knob 32 on the shaft 61, tightening of the set screw 72 provides a direct drive connection to the shaft 61 which, as previously described, rotates freely relative to the hub assembly 48. The pins 75 received in the apertures 74 of the friction disc 73 provide a friction drive connection between the knob 32 and the hub assembly 48 including the drive gear 47 forming a part thereof. Under these circumstances, as long as the filter disc 44 is free to rotate, the frictional engagement of the disc 73 with the knob 32 as provided by the friction ring 76 supplied an adequate drive connection between the knob 32 and the hub assembly 48 for filter disc rotation. However, upon locking of the filter disc 44 in a manner to be described, the frictional drive described is overcome and upon rotation of the knob 32, only the shaft 61 and associated switch portions will rotate and the friction disc 73 will slide in the knob recess. In this respect then, the switch arrangement is double acting to provide for concurrent filter disc rotation and selective potentiometer coupling and uncoupling in the probe circuit while still further providing for selective potentiometer coupling and uncoupling independent of filter disc rotation when the filter disc is locked against rotation.

The enlarged portion 30 of the probe housing further carries therein a pre-amplifier stage assembly 80 which is of known type. Such an assembly includes a vacuum tube for preamplification of a signal derived from the operation of the probe. The pre-amplifier 80 is protectively mounted within a U-shaped mounting bracket 81 which is suitably secured to the bottom plate 54 of the probe by means of a screw or screws 82. The sides of the casing of the pre-amplifier 80 carry shock pads 83 of suitable material, such as rubber, to resiliently mount the pre-amplifier in the probe and protect the same against shock, etc.

Location of the filter disc 44 and associated gearing is generally illustrated in FIG. 5 in broken lines. More specifically, the arrangement is shown in detail in FIG. 6. It will be noted that the center of rotation of the gear 46 is out of alignment with the centers of rotation of the gears 45 and 47. This arrangement provides for automatic gear clearance adjustment and prevents binding. The filter disc 44 includes near the outer periphery thereof a plurality of color filters 85, 86 and 87. The filter 85 is a red filter whereas the filter 86 is green and the filter 87 is blue. These filters are secured in suitable openings in the disc 44 in any efficient manner such as by cementing. In addition, the filter disc 44 carries an aperture 88 which is equally circumferentially spaced relative to the filters 85–87 and is of the same diameter. This aperture functions for time measurements as well as for black and white printing calibration and probing. Turning of the knob 32 results in operative positioning of any one of the filters 85–87 and aperture 88 between the aperture lens system 31 and the window opening 59 of the magnetic yoke 56 thus placing the same in operative alignment with the phototube 51. Turning of the knob 32 to the "Off" position shown in FIG. 3 rotates a blank portion of the disc 44 into position below the aperture lens system 31 to protect the phototube 51 from room lights.

The pointer 33 of the knob 32 indicates the position of the filter disc 44 in conjunction with the coordinated indicia carried on the top surface of the probe housing 28. For black and white light evaluating purposes in a manner to be described, the aperture 88 is moved into operative position by suitable rotation of the knob 32 to bring the pointer 33 into alignment with the indicia "T" on the face of the probe housing. For subsequent coupling and uncoupling of the various potentiometers into and out of the probe circuit, a movable lock arm 90 is fixedly attached to the lock switch button 34, as shown in FIGS. 6 and 7, and is provided with a lock flange 91 which is movable into and out of a lock groove 92 formed in the periphery of the filter disc 44. The groove 92 is so located that the lock switch is operative only when the aperture 88 is in operative position within the probe. Accordingly, when it is desired to make "time" or various black and white light density readings, the knob 32 is moved as earlier indicated with the aperture 88 being placed in operative position and the button 34 is moved forwardly to place the lock flange 91 in the groove 92 and hold the filter disc against further rotation during subsequent operation of the switch 50. As previously described, locking of the filter disc 44 in this manner prevents rotation of the hub 48 and the friction disc 73 tightly held in the knob 32 slips relative thereto upon rotation of the knob 32 but the shaft 61 of the switch 50 continues to rotate with the knob 32 by reason of the set screw 72.

FIG. 8 illustrates the wiring diagram of the probe 21 particularly in connection with the operation thereof with any one of the potentiometers 67 and 68 coupled in the circuit. Upon light contacting the phototube 51, a space current is set up between the electrodes thereof, this current being modulated by the magnetic field set up by the coils 58 of the magnetic yoke 56 in the known manner as disclosed in the aforementioned patent. A suitable alternating current source is connected to the coils 58 as indicated in the diagram. The modulated current set up in the phototube 51 is fed to the pre-amplifier stage 80 and develops voltage across a pre-amplifier input impedance 95 forming a part of the pre-amplifier stage circuitry. This voltage is then amplified in the pre-amplifier stage 80 and fed into the switching circuit of switch 50. For clarity of description, the switch 50 is illustrated in two parts with the left hand portion in the diagram representing the front wafer of the switch and the right half portion in the diagram representing the rear wafer of the switch. Each of these wafers include a "G" half and an "F" half for utilization with the two separate rows of potentiometers as previously described. The particular half of the switch portions utilized will depend upon the positioning of the switch 35 and for purposes of description, this switch is illustrated in FIG. 8 as closed to the "G" position. The signal voltage enters the front wafer of switch 50 through the wiper contact 5 of the "G" half of the switch 50 and leaves through the contact 1 to the "R" (red) potentiometer 67. All of the potentiometers are connected to a common ground 96, The signal voltage across the "R" potentiometer 67 is fed through the "G" half of the rear wafer portion of the switch 50 and through the switch 35 into the main amplifier and meter unit 23 as previously described. In this unit the signal is further amplified and a reading is given by the meter. Other positions of the various switches described place the different potentiometers in the probe circuit for operation in the same manner.

The probe 21 of the present invention permits a photographer or printer to obtain consistent printing results under the best possible color tone reproduction conditions. Use of the probe reduces waste of printing paper and also reduces time consumed by eliminating trial and error methods. With the probe properly calibrated in a manner to be described, subsequent printing operations even with unknown negatives require less skill on the part of the operator. The probe is also useful with black and white printing particularly in connection with the use of different emulsion speeds and variable contrast papers.

In color printing, the printer must experiment with various combinations of color filters placed in the enlarger in an effort to obtain the proper color tone reproduction for a given negative. This is standard practice, is time consuming and is wasteful from the standpoint that a number of prints must be made until a suitable one is obtained, the earlier unsuitable prints being discarded. With the use of the probe 21 of the present invention, an average or master negative may be utilized to calibrate the probe for subsequent efficient utilization with unknown negatives. Accordingly, a master negative is subjected to experimental printing until the proper filter combination is determined for reproduction of a suitable color balance. This negative is retained in the enlarger, the proper color filtration determined by trial and error is noted and the color filters are removed from the enlarger. The probe is placed on the easel 15 with the aperture lens system 31 thereof located at the center of interest of the projected image or at any other suitable location as desired. The knob 32 is turned to the "R" position to place the red filter 85 into operative position between the aperture lens system 31 and the probe 51. The turning of the knob to this extent results in simultaneous coupling of the "R" potentiometer 67 or 68 into the probe circuit depending upon the position of the switch button 35. As previously described, this switch controls the use of either the gray card row "G" of potentiometers or the flesh tone row "F" of potentiometers depending upon the point at which the light density of the projected negative is read. During color readings, the lock switch 34 is, of course, in the filter disc release position for free rotation of the disc 44.

Operation of the probe to the extent described results in a meter reading and the printer then zeros the meter by adjusting the calibration control 25 of the amplifier and meter unit 23 or by combinedly making this adjustment directly at the potentiometer through its adjustment means 36 accessible at the top of the casing of the probe. Upon zeroing of the initial reading, the knob 32 is turned to the "G" position resulting in movement of the green filter 86 into operative position and uncoupling of the "R" potentiometer and coupling of the "G" potentiometer in the probe circuit. A meter reading is obtained and the meter is calibrated to read the earlier determined filtration necessary for the green light component by adjustment of the "G" potentiometer through its adjustment means 36 accessible from the top of the probe. The knob 32 is then moved to "B" position and the calibration is repeated for the blue light component. The knob 32 is then moved to the "T" position placing the open aperture 88 in operative position and an adjustment is made at the "T" potentiometer now coupled in the circuit to bring the meter pointer to the time position on the scale which has already been found adequate for the master negative by trial and error. In this manner, the probe is calibrated for a given color balance. The presence of the two separate rows of potentiometers in the probe permits calibration for different master negatives, one being based on the gray card photographed on the negative and the other being used in connection with flesh tone or other centers of interest of the projected image. It will be appreciated that the two rows of potentiometers may be used for any suitable light component balancing purpose.

With the probe calibrated, an unknown negative may be subjected to color balance probing and readings taken directly from the meter will indicate the proper color filter balance to be inserted in the enlarger for efficient printing of the unknown negative. This is accomplished by projecting the unknown negative onto the color probe in the manner previously described and following the same sequence of probe operation set forth above. In the "R" position of the knob 32 of the probe, the meter reading obtained is zeroed by adjustment of the potentiometer "R" coupled in the probe circuit, this adjustment being attended to through the potentiometer adjustment means 36 a the probe. In this respect then, the "R" reading is utilized as a reference point and subsequent readings in the "G" and "B" positions of the knob 32 will indicate the necessary color filter combination that should be placed in the enlarger for immediate color balance printing of the unknown negative. In the "T" position of the knob 32, the reading obtained is used in adjusting the aperture of the enlarger while the probe is still operative to bring the meter pointer into indication relation with the same printing time utilized with the master negative. It can be readily appreciated that little instruction is necessary for a person completely unfamiliar with the technical aspects of photography in order to train the person for efficient operation of the probe and consistently efficient printing of unknown negatives.

As previously described, the probe of the present invention is also readily adapted for use in black and white printing during which the color filters of the disc 44 are locked out of operative use by the lock switch 35 in the manner previously described. The knob 32 will continue to couple and uncouple the various potentiometers into and out of the probe circuit and each of the potentiometers may be calibrated for printing operations using different types of printing paper. In this respect, in black and white printing there is a total of eight adjustments (all of the potentiometers) as the exposure time is set for a given aperture setting based on a master negative print and does not change.

While the probe of the present invention has been described in detail in connection with its use in photography, it will be understood that this probe has other uses. Color readings may be made in industrial applications as well as photographic applications. The probe has also been described solely in connection with the taking of projected readings and it should be understood that the same may be used in taking integrated readings at the lens of a projection system. Furthermore, the probe can be used in combination with a reflection attachment to obtain reflection readings.

Obviously certain modifications and variations of the invention as hereinbefore set forth may be made without departing from the spirit and scope thereof, and therefore only such limitations should be imposed as are indicated in the appended claims.

I claim:

1. A light measuring device including a single phototube arranged for light contact, a series connected measuring circuit including said phototube and further comprising a plurality of variable resistors in the form of adjustable potentiometer means each having its own adjustment means to vary the resistance of said circuit, switch means series connected between said phototube and all of said potentiometer means, phototube driving and space current modulation means active on said phototube in said circuit and connected to alternating current generating means, and amplification means connected in series with said potentiometer means for amplification of a space current signal developed in said phototube and selectively fed through at least one of said potentiometer means as determined by the operation of said switch means.

2. A color probe device including a housing having a light receiving aperture therein, current generating light sensitive means in said housing and aligned with said aperture, switch means forming a part of said device, a variable color filter system forming a part of said device and located to filter light passing through said aperture, said filter system being operatively engaged with said switch means for variable positioning thereof, a plurality of variable resistance potentiometer means in said housing each including separate adjustment means forming a part thereof and accessible through said housing, circuit means electrically interconnecting said light sensitive means, switch means and all of said potentiometer means in series, said switch means providing for selective coupling and uncoupling of each of said potentiometer means as variable series resistors in selected light filtering systems in said circuit means independently of the other potentiometer means simultaneously with corresponding color filter selection and operative positioning of the selected filter relative to said aperture, and means operable with said filter system and said switch means to operatively isolate said filter system from said switch means for fixed positioning thereof during variable selective coupling and uncoupling of said potentiometer means in said circuit means.

3. A color probe device including a housing having a light receiving aperture therein, current generating light sensitive means in said housing and aligned with said aperture, switch means forming a part of said device, a variable color filter system forming a part of said device and located to filter light passing through said aperture, said filter system being operatively engaged with said switch means for variable positioning thereof, a plurality of variable resistance potentiometer means in said housing each including separate adjustment means forming a part thereof and accessible through said housing, circuit means electrically interconnecting said light sensitive means, switch means and all of said potentiometer means in series, said switch means providing for selective electrical coupling and uncoupling of each of said potentiometer means as variable series resistors in selected light filtering system in said circuit means independently of the other potentiometer means simultaneously with corresponding color filter selection and operative positioning of the selected filter relative to said aperture, said variable color filter system comprising a disc mounted for rotation by said switch means and having a plurality of different color window-like filters mounted therein in circumferentially spaced relation, said disc being further provided with an aperture for non-color light measurement use, said disc being gear driven by a first portion of said switch means which is friction coupled to a second portion thereof operative in the coupling and uncoupling of said potentiometer means in said circuit means, and disc lock means forming a part of said device to lock said disc with said aperture for non-color light measurement use in operative position during which the friction coupling of said first portion to said second portion of said switch means is overcome to provide for selective coupling and uncoupling of said potentiometer means in said circuit independent of color filter selection.

4. A color probe device including a housing having a light receiving aperture therein, a phototube in said housing and aligned with said aperture, a lens system in said aperture for directing light on said phototube, switch means carried by said housing and extending thereinto, a variable filter system in said housing and located to filter light passing through said lens system between the same and said phototube, said filter system being operatively engaged with said switch means for variable positioning thereof, a plurality of variable resistance potentiometer means in said housing each including separate adjustment means forming a part thereof and accessible through said housing, circuit means electrically interconnecting said phototube, switch means and all of said potentiometer means in series, said switch means providing for selective electrical coupling and uncoupling of each of said potentiometer means as variable series resistors in selected light filtering systems in said circuit means independently of the other potentiometer means simultaneously with corresponding color filter selection and operative positioning of the selected filter relative to said lens system, a pre-amplifier means in said housing and connected in said circuit means between said phototube and switch means in series therewith to receive a signal from said phototube for amplification for switching operation, said pre-amplifier means being enclosed in a casing which is mounted in said housing by resilient cushioning means, and means operable with said filter system and said switch means to operatively isolate said filter system from said switch means for fixed positioning thereof during variable selective coupling and uncoupling of said potentiometer means in said circuit means.

5. A color probe device including a housing having a light receiving aperture therein, a phototube in said housing and aligned with said aperture, a lens system in said aperture for directing light on said phototube, switch means carried by said housing and extending thereinto, a variable filter system in said housing and located to filter light passing through said lens system between the same and said phototube, said filter system being operatively engaged with said switch means for variable positioning thereof, a plurality of variable resistance potentiometer means in said housing each including separate adjustment means forming a part thereof and accessible through said housing, circuit means electrically interconnecting said phototube, switch means and all of said potentiometer means in series, said switch means providing for selective electrical coupling and uncoupling of each of said potentiometer means as variable series resistors in selected light filtering systems in said circuit means independently of the other potentiometer means simultaneously with corresponding color filter selection and operative positioning of the selected filter relative to said lens system, a pre-amplifier means in said housing and connected in said circuit means between said phototube and switch means in series therewith to receive a signal from said phototube for amplification for switching operation, said pre-amplifier means being enclosed in a casing which is mounted in said housing by resilient cushioning means, said variable color filter system comprising a disc mounted for rotation by said switch means and having a plurality of different color window-like filters mounted therein in circumferentially spaced relation, said disc being further provided with an aperture for non-color light measurement use, said disc being gear driven by a first portion of said switch means which is friction coupled through a second portion thereof operative in the coupling and uncoupling of said potentiometer means in said circuit means.

6. A color probe device including a housing having a light receiving aperture therein, a phototube in said housing and aligned with said aperture, a lens system in said aperture for directing light on said phototube, switch means carried by said housing and extending thereinto, a variable filter system in said housing and located to filter light passing through said lens system between the same and said phototube, said filter system being operatively engaged with said switch means for variable positioning thereof, a plurality of variable resistance potentiometer means in said housing each including separate adjustment means forming a part thereof and accessible through said housing, and a circuit electrically interconnecting said phototube, switch means and all of said potentiometer means, said switch means providing for selective electrical coupling and uncoupling of each of said potentiometer means as variable series resistors in said circuit independently of the others and for corresponding color filter selection and operative positioning thereof relative to said lens system, a pre-amplifier means in said housing circuit connected between said phototube and switch means in series therewith to receive a signal from said phototube for amplification for switching operation, said pre-amplifier means being enclosed in a casing which is mounted in said housing by resilient cushioning means, said device further including electromagnetic means positioned relative to said phototube for modulation of a space current generated therein on contact of light with said phototube, said variable color filter system being in the form of a disc mounted for rotation by said switch means and having a plurality of different color window-like filters mounted therein in circumferentially spaced relation, said disc being further provided with an aperture for non-color light measurement use, said disc being gear driven by a first portion of said switch means which is friction coupled to a second portion thereof operative in the coupling and uncoupling of said potentiometer means in said circuit, and disc lock means forming a part of said device to lock said disc with said aperture for non-color light measurement use in operative position during which the friction coupling of said first portion to said second portion of said switch means is overcome to provide for selective coupling and uncoupling of said potentiometer means in said circuit independent of color filter selection.

References Cited in the file of this patent

UNITED STATES PATENTS

| | | |
|---|---|---|
| 2,356,238 | Gillett et al. | Aug. 22, 1944 |
| 2,424,933 | Kalmus | July 29, 1947 |
| 2,885,926 | Molloy | May 12, 1959 |
| 2,921,498 | Simmon et al. | Jan. 19, 1960 |
| 2,947,232 | Armentrout et al. | Aug. 2, 1960 |
| 2,995,978 | Glandon et al. | Aug. 15, 1961 |
| 3,002,425 | Biedermann et al. | Oct. 3, 1961 |
| 3,003,388 | Hunter et al. | Oct. 10, 1961 |